United States Patent
Noda et al.

(10) Patent No.: US 6,757,230 B2
(45) Date of Patent: Jun. 29, 2004

(54) INFORMATION RECORDING MEDIUM, INFORMATION REPRODUCTION APPARATUS, AND INFORMATION RECORDING APPARATUS

(75) Inventors: Chosaku Noda, Kawasaki (JP); Yutaka Okamoto, Chofu (JP); Yutaka Kashihara, Fuchu (JP); Hideo Ando, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 553 days.

(21) Appl. No.: 09/916,591

(22) Filed: Jul. 30, 2001

(65) Prior Publication Data

US 2002/0027847 A1 Mar. 7, 2002

(30) Foreign Application Priority Data

Jul. 31, 2000 (JP) .................................... 2000-231865

(51) Int. Cl.[7] .............................. G11B 7/00; G11B 5/09
(52) U.S. Cl. ................... 369/47.54; 369/47.47; 369/275.3; 369/275.4; 369/59.25; 369/30.1
(58) Field of Search ............................. 369/111, 275.3, 369/275.4, 44.26, 59.25, 47.22, 47.27, 47.47, 47.48, 47.54, 30.1, 30.12

(56) References Cited

U.S. PATENT DOCUMENTS

| | | | | |
|---|---|---|---|---|
| 5,170,385 A | * | 12/1992 | Senshu et al. ............. | 369/111 |
| 5,568,459 A | * | 10/1996 | Takamori et al. ......... | 369/47.48 |
| 5,870,375 A | * | 2/1999 | Maeda et al. ............ | 369/275.3 |
| 5,878,007 A | * | 3/1999 | Matsumoto et al. ...... | 369/275.3 |
| 5,966,368 A | * | 10/1999 | Kobayashi et al. ....... | 369/275.3 |
| 6,128,269 A | * | 10/2000 | Ishida et al. ............. | 369/59.25 |
| 6,128,272 A | * | 10/2000 | Horimai et al. .......... | 369/44.26 |
| 6,249,508 B1 | * | 6/2001 | Senshu .................... | 369/275.3 |
| 6,628,578 B1 | * | 9/2003 | Nakamura et al. ....... | 369/275.3 |

FOREIGN PATENT DOCUMENTS

| | | |
|---|---|---|
| JP | 10-134421 | 5/1998 |
| JP | 11-120622 | 4/1999 |
| WO | WO 00/08638 | 2/2000 |

* cited by examiner

*Primary Examiner*—Thang V. Tran
(74) *Attorney, Agent, or Firm*—Oblon, Spivak, McClelland, Maier & Neustadt, P.C.

(57) ABSTRACT

An information recording medium of this invention has a spiral track. The spiral track has one or more header fields per round of the spiral track, and a data field located between neighboring header fields. The data field has a variable length corresponding to an integer multiple of a predetermined length Lw so as to minimize a deviation between the n-th header field in a predetermined round of the spiral track, and the n-th header field in a round different from the predetermined round in the track direction.

11 Claims, 14 Drawing Sheets

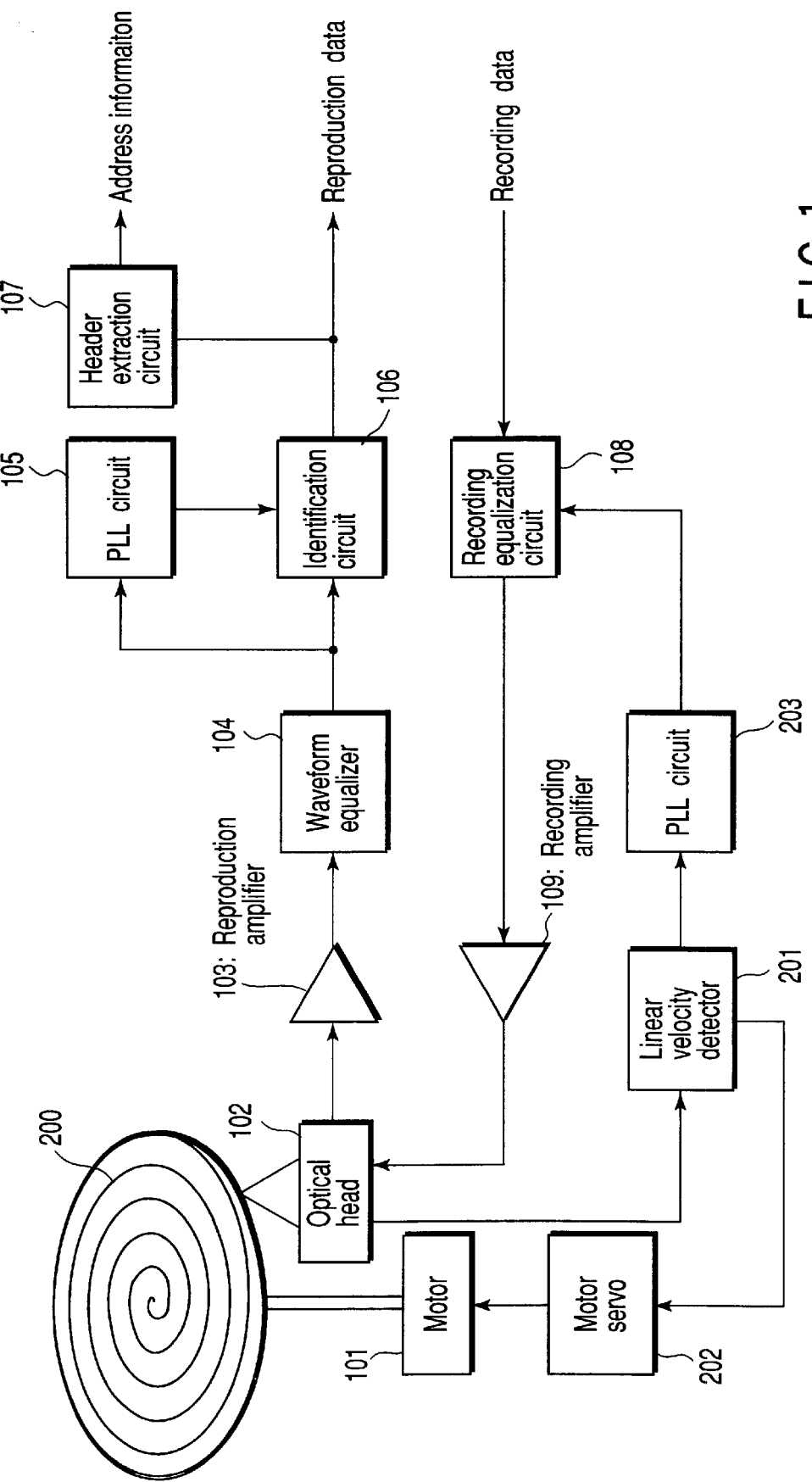
F I G. 1

INFORMATION RECORDING MEDIUM, INFORMATION REPRODUCTION APPARATUS, AND INFORMATION RECORDING APPARATUS

CROSS-REFERENCE TO RELATED APPLICATIONS

This application is based upon and claims the benefit of priority from the prior Japanese Patent Applications No. 2000-231865, filed Jul. 31, 2000, the entire contents of which are incorporated herein by reference.

BACKGROUND OF THE INVENTION

1. Field of the Invention

The present invention relates to an improvement of the format of an information recording medium such as an optical disk or the like. The present invention also relates to an information reproduction apparatus for reproducing data recorded on such information recording medium, and an information recording apparatus for recording data on such information recording medium.

2. Description of the Related Art

An optical disk apparatus that reads/writes digital data mainly performs CAV recording in which the rotational speed is constant. On an optical disk to be processed, digital data is recorded to form a spiral signal track. Optical disks may include a read-only disk on which data have been recorded as an embossed pattern on the disk surface in the manufacture, and a disk which has both a recordable region and a read-only region, in addition to a recordable recording/reproduction type disk.

Upon reproduction, a motor rotates an optical disk, and an optical head reads out a signal recorded on the optical disk using a laser beam. In the optical head, a light beam emitted by an LD (laser diode) is focused on a pit sequence on a track formed on the optical disk by an objective lens. The light beam reflected by the optical disk is focused on a photodetector via a focusing lens, thus obtaining a reproduction signal.

A signal output from the optical head is amplified by a reproduction amplifier, and then undergoes waveform equalization by a waveform equalizer. The waveform equalizer comprises a filter having, e.g., high-frequency emphasis characteristics to facilitate identification of digital data successively recorded along a track.

In order to reconstruct original data from the recorded digital data, the equalized reproduction signal must be converted into binary data of 0 or 1, and data must be identified in synchronism with clocks. No clock signal is recorded especially on the optical disk. For this reason, a PLL circuit generates a reproduction clock signal based on the reproduction signal. On the other hand, an identification circuit outputs binary identification data in synchronism with the reproduction clock signal output from the PLL circuit.

Upon recording, a header extraction circuit detects a header field. The header field records address information and the like. The current position is detected based on the address information recorded in the header, and the optical head is moved on the basis of a deviation between the current position and recording start position. When the optical head has reached the recording start position, recording of objective data starts.

The optical disk is divided into a plurality of doughnut-like zones, and a constant rotational speed of the disk is maintained within each zone. Data is recorded while the rotational speed is constant. In a given zone, the recorded data size per rotation of the disk is constant. In other words, respective zones have different recorded data sizes per rotation.

Headers are laid out on the disk at a given spacing. An integer number of headers are laid out per rotation. Due to different distances per rotation on the inner and outer peripheral sides of the disk, headers are radially laid out in a zone. A discontinuous portion is formed between neighboring zones. The number of headers per rotation differs depending on zones, and the number of headers increases toward the outer periphery. Since the header positions in neighboring tracks are aligned except for a zone boundary portion, headers can be prevented from being destroyed by operation errors, and crosstalk disturbance from a header to recorded data with respect to a reproduction signal can be prevented.

However, when the aforementioned header layout is adopted, since the rotational speeds of the disk at a boundary portion of zones become discontinuous, data cannot be recorded near the boundary of zones. Furthermore, since the data size per rotation is constant within a zone, the linear recording density on the outer peripheral side becomes lower than that on the inner peripheral side of a zone. As a result, the data recording efficiency on the whole disk drops.

On the other hand, in order to improve the data recording density and to increase the recording capacity of the disk, a constant linear recording density scheme is suitable. However, when recording is done using the constant linear recording density scheme, the recorded data size per rotation changes in proportion to the radius from the inner to the outer periphery of the disk. Hence, when a header is laid out at the head position of each constant recorded data block, the headers are scattered at arbitrary locations on the disk.

As a result, when a track error has occurred during recording due to operation errors, data may be inadvertently recorded on a header to destroy the header. Since the header positions between neighboring tracks are not aligned, a reproduction signal of recorded data deteriorates by a header signal from a neighboring track.

In this way, in the conventional header layout method, when recording is done using the constant rotational speed scheme, the average data recording efficiency lowers to reduce the storage capacity of the disk.

When recording is done using the constant linear density scheme to improve the data recording efficiency, since header positions are not aligned between neighboring tracks, the system reliability and reproduction signal quality suffer.

The present invention has been made in consideration of the above situation, and has as its object to provide the following information recording medium, information reproduction apparatus, and information recording apparatus:

a highly reliable information storage medium which can minimize a positional deviation between headers of neighboring tracks without reducing the overall storage capacity, an information reproduction apparatus which can reproduce data recorded on the highly reliable information storage medium, and an information recording apparatus which can record data on the highly reliable information storage medium.

BRIEF SUMMARY OF THE INVENTION

In order to solve the aforementioned problems and to solve the above object, an information recording medium, information reproduction apparatus, and information recording apparatus of the present invention have the following arrangements.

(1) An information recording medium of the present invention has a spiral track, the spiral track has one or more header fields per round of the spiral track, and a data field located between neighboring header fields, and the data field has a variable length corresponding to an integer multiple of a predetermined length Lw so as to minimize a deviation between an n-th header field in a predetermined round of the spiral track, and an n-th header field in a round different from the predetermined round in a track direction.

(2) The present invention is directed to an information reproduction apparatus for reproducing an information recording medium, the information recording medium having a spiral track, the spiral track having one or more header fields per round of the spiral track, and a data field located between neighboring header fields, and the data field having a variable length corresponding to an integer multiple of a predetermined length Lw so as to minimize a deviation between an n-th header field in a predetermined round of the spiral track, and an n-th header field in a round different from the predetermined round in a track direction, and the information reproduction apparatus of the present invention comprising rotation control means for controlling a rotational speed of the information recording medium to obtain a constant linear velocity, header processing means for detecting the header field from the information recording medium which undergoes the rotation control of the rotation control means, and reproducing address information from the header field, and reproduction means for reproducing target data from the data field on the basis of the address information obtained by the header processing means.

(3) The present invention is directed to an information recording apparatus for recording data on an information recording medium, the information recording medium having a spiral track, the spiral track having one or more header fields per round of the spiral track, and a data field located between neighboring header fields, and the data field having a variable length corresponding to an integer multiple of a predetermined length Lw so as to minimize a deviation between an n-th header field in a predetermined round of the spiral track, and an n-th header field in a round different from the predetermined round in a track direction, and the information recording apparatus of the present invention comprising rotation control means for controlling a rotational speed of the information recording medium to obtain a constant linear velocity, header processing means for detecting the header field from the information recording medium which undergoes the rotation control of the rotation control means, and reproducing address information from the header field, and recording means for recording target data on the data field on the basis of the address information obtained by the header processing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

FIG. 1 is a schematic block diagram showing the arrangement of an information recording/reproduction apparatus according to an embodiment of the present invention;

DETAILED DESCRIPTION OF THE INVENTION

Figure 2:
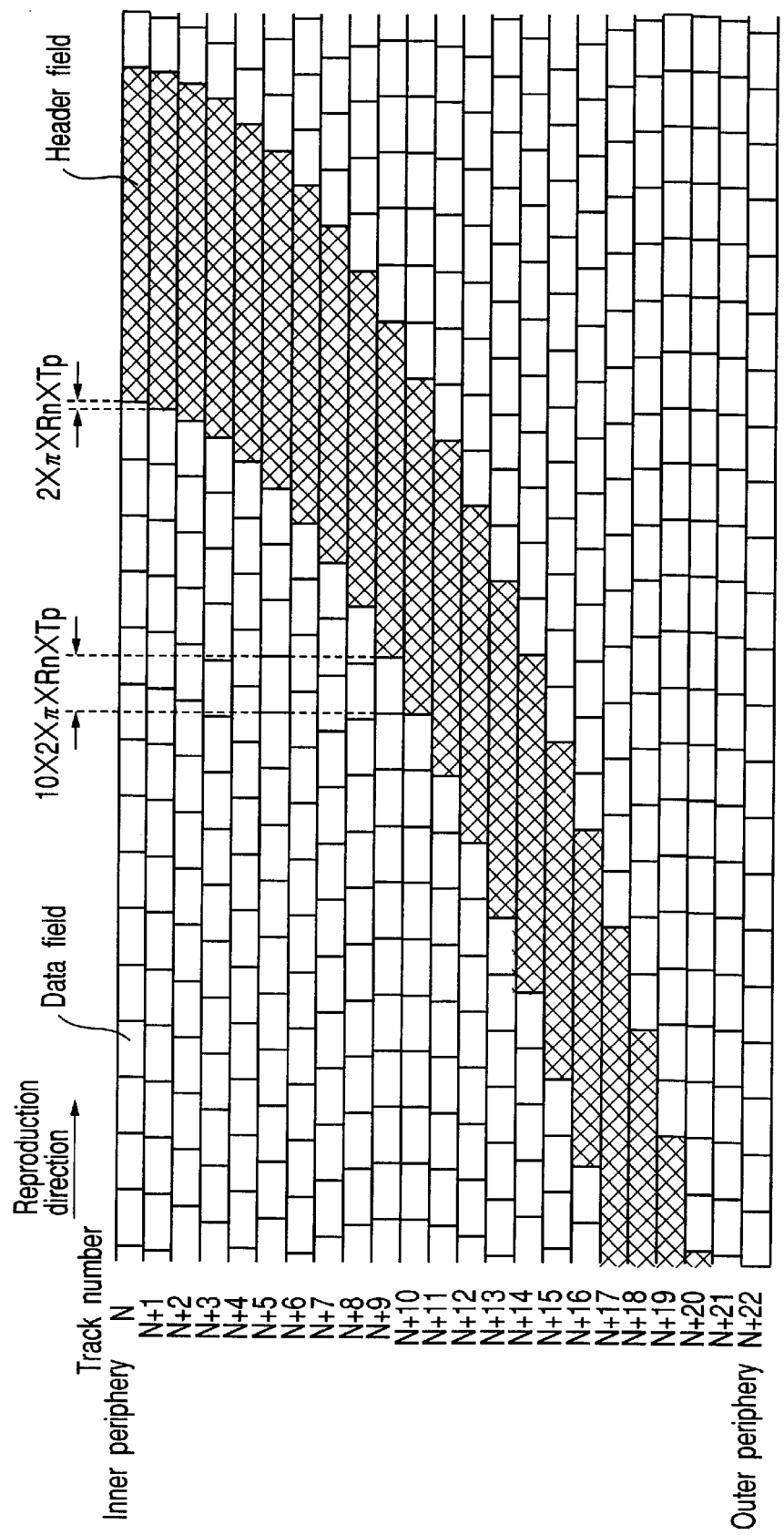
FIG. 2 shows the layout of headers when headers are laid out at an equal spacing while the linear recording density is constant.

Preferred embodiments of the present invention will be described hereinafter with reference to the accompanying drawings.

FIG. 1 is a schematic block diagram showing the arrangement of an information recording/reproduction apparatus according to an embodiment of the present invention.

On an optical disk 200 of the present invention, data is recorded using a constant linear density scheme. For this purpose, the rotational speed of this optical disk must be controlled to obtain a constant linear velocity. The linear velocity can also be obtained from the radial position of an optical head. However, to implement more accurate control, information for velocity detection is recorded in advance on the disk. As a method of recording velocity information without any data recording efficiency drop, for example, a method of using wobbled grooves is known. The wobbled grooves are obtained by radially varying guide grooves, which are formed on the disk and used in track control, at a given period. By varying the groove, a variation component is superposed on a tracking error signal obtained from this groove.

A linear velocity detector 201 extracts a component near a specific frequency from a tracking error signal, and generates a velocity error signal using a predetermined deviation from a predetermined frequency. By controlling the rotational speed of a motor 101 by a motor servo 202 using the velocity error signal, recording can be done using the constant linear density scheme. Also, by controlling a recording clock signal that determines the output timing of recorded data in a recording PLL circuit 203 from the velocity error signal, recording can be done using the constant linear density scheme.

A spiral track is formed on the surface of the optical disk 200 from the inner to the outer periphery. Header and data fields are alternately laid out along the track. Each header field includes an area of pre-pits, and the like, which has a role of indicating address information used upon recording, and a write reference position, and is formed in the manufacture of a disk. Each data field allows additional recording and rewrite later, and is recorded with recording data information and parity data for error correction.

Upon reproduction, the motor 101 rotates the optical disk 200, and an optical head 102 reads out a signal recorded on the optical disk 200 using a laser beam. In the optical head 102, a light beam emitted by an LD (laser diode) is focused on a pit sequence on a track formed on the optical disk 200 by an objective lens. The light beam reflected by the optical disk 200 is focused on a photodetector via a focusing lens, thus obtaining a reproduction signal.

A signal output from the optical head 102 is amplified by a reproduction amplifier 103, and then undergoes waveform equalization by a waveform equalizer 104. The waveform equalizer 104 comprises a filter having, e.g., high-frequency emphasis characteristics to facilitate identification of digital data successively recorded along a track.

In order to reconstruct original data from the recorded digital data, the equalized reproduction signal must be converted into binary data of 0 or 1, and data must be identified in synchronism with clocks. No clock signal is recorded especially on the optical disk. For this reason, a reproduction PLL circuit 105 generates a reproduction clock signal based on the reproduction signal. On the other hand, an identification circuit 106 outputs binary identification data in synchronism with the reproduction clock signal output from the PLL circuit 105.

Upon recording, a header extraction circuit 107 detects a header field. The header field records address information and the like. The current position is detected based on the address information recorded in the header, and when the current position deviates from the recording start position, the optical head 102 is moved to the recording start position. When the optical head 102 has reached the recording start position, recording of recording data starts. In this connection, recording data is converted into a predetermined recording waveform by a recording equalization circuit 108, and is recorded on the optical disk 200 via a recording amplifier 109.

The header layout between neighboring tracks upon inserting headers at a given spacing on a disk on which data is recorded by the constant linear density scheme will be explained below.

For the sake of simplicity, the track shape is considered as a circle. If Rn represents the radius of an N-th track from the innermost periphery, a length Ln of a track for one revolution is given by:

$$Ln = 2 \times \pi \times Rn \quad (1)$$

If Ns headers are laid out on this track with reference to this N-th track, the spacing between neighboring headers is Ln/Ns.

If TP represents the track pitch from a neighboring track, a length Ln+1 of the (N+1)-th track is given by:

$$\begin{aligned} Ln+1 &= 2 \times \pi \times Rn+1 \quad (2)\\ &= 2 \times \pi \times (Rn+TP)\\ &= (2 \times \pi \times Rn) + (2 \times \pi \times TP)\\ &= Ln + (2 \times \pi \times TP) \end{aligned}$$

and is longer than the N-th track by $2 \times \pi \times TP$.

Likewise, a length Ln+Nz of the (N+Nz)-th track is given by:

$$\begin{aligned} Ln+nz &= 2 \times \pi \times Rn + nz \quad (3)\\ &= 2 \times \pi \times (Rn + TP \times Nz)\\ &= (2 \times \pi \times Rn) + (2 \times \pi \times TP \times Nz)\\ &= Ln + (2 \times \pi \times TP \times Nz) \end{aligned}$$

Paying attention to fields around a given header on the N-th track, surrounding headers are laid out, as shown in FIG. 2. Since the track length increases with increasing distance from the reference track toward the outer periphery, if headers are laid out at a fixed spacing, a deviation between the header positions of neighboring tracks gradually becomes large.

Hence, by variably controlling the header spacings (=data fields) to suppress the deviation of the header position to be equal to or smaller than a predetermined value, header positions on the optical disk are concentrated on a specific region. Upon variably controlling the header spacings, the header spacing is controlled to be an integer multiple of Lw (LW is a minimum unit of variable control). The length of each header is fixed, and is set to be an integer multiple of Lw.

Figure 13:
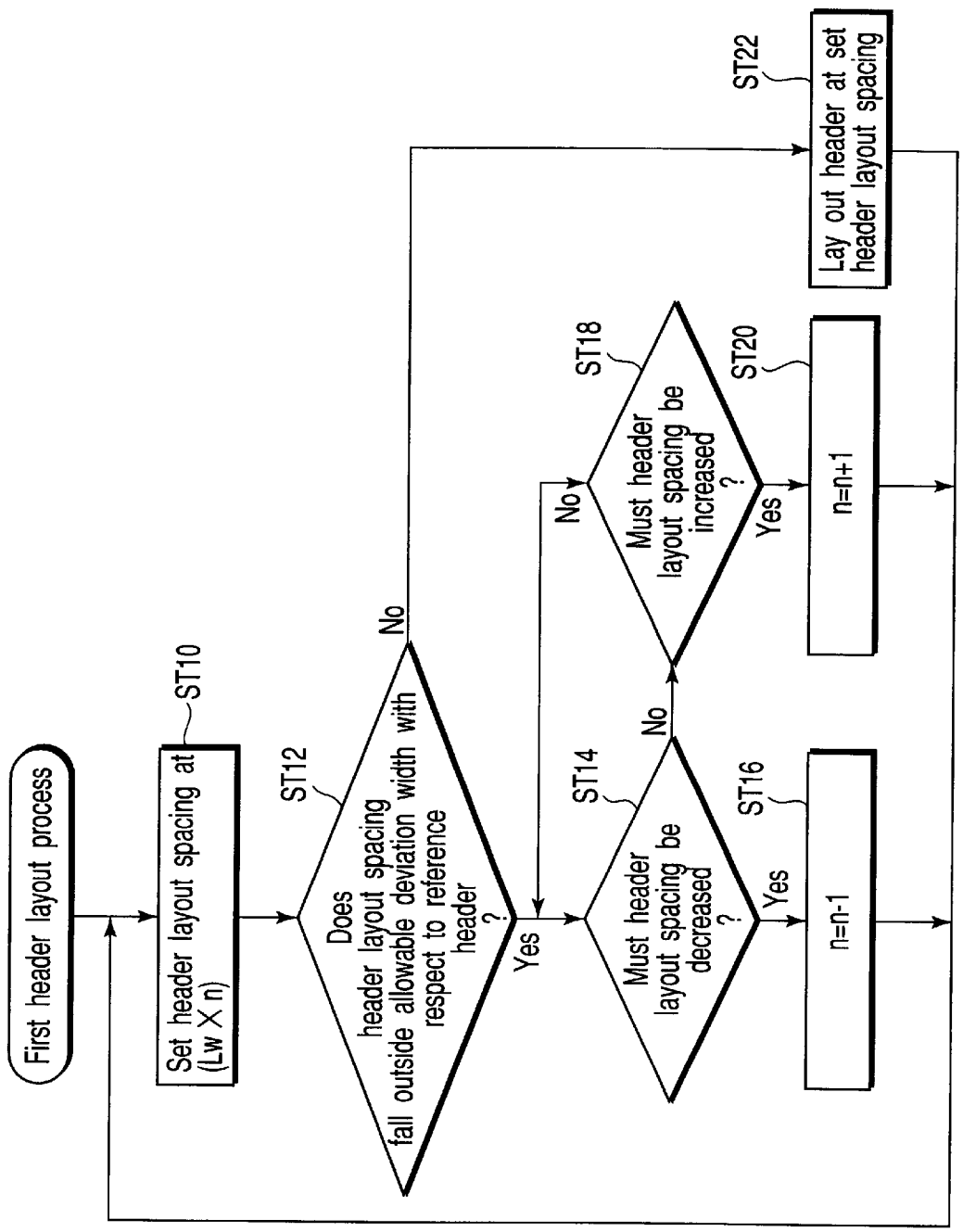
FIG. 13 is a flow chart for explaining the first header layout process.

The first header layout will be explained below with reference to the flow chart shown in FIG. 13.

One header per rotation is laid out on the N-th track, and headers are laid out in turn from the inner peripheral side with reference to this header position. At this time, the spacing (data fields) between neighboring headers is variably controlled to a length corresponding to an integer multiple of the minimum unit Lw so as to always minimize the deviation from the reference header in the track direction.

That is, a header layout spacing is set at (Lw×n) (step ST10). If the header layout spacing falls outside an allowable deviation width with respect to the reference header (ST12, YES), and the header layout spacing must be decreased (ST14, YES), n=n−1 (ST16). That is, the header layout spacing is (Lw×(n−1)). Conversely, if the header layout spacing must be increased (ST18, YES), n=n+1 (ST20). That is, the header layout spacing is (Lw×(n+1)). If the header layout spacing does not fall outside the allowable deviation width with respect to the reference header (ST12, NO), headers are laid out at the set header layout spacing.

Figure 3:
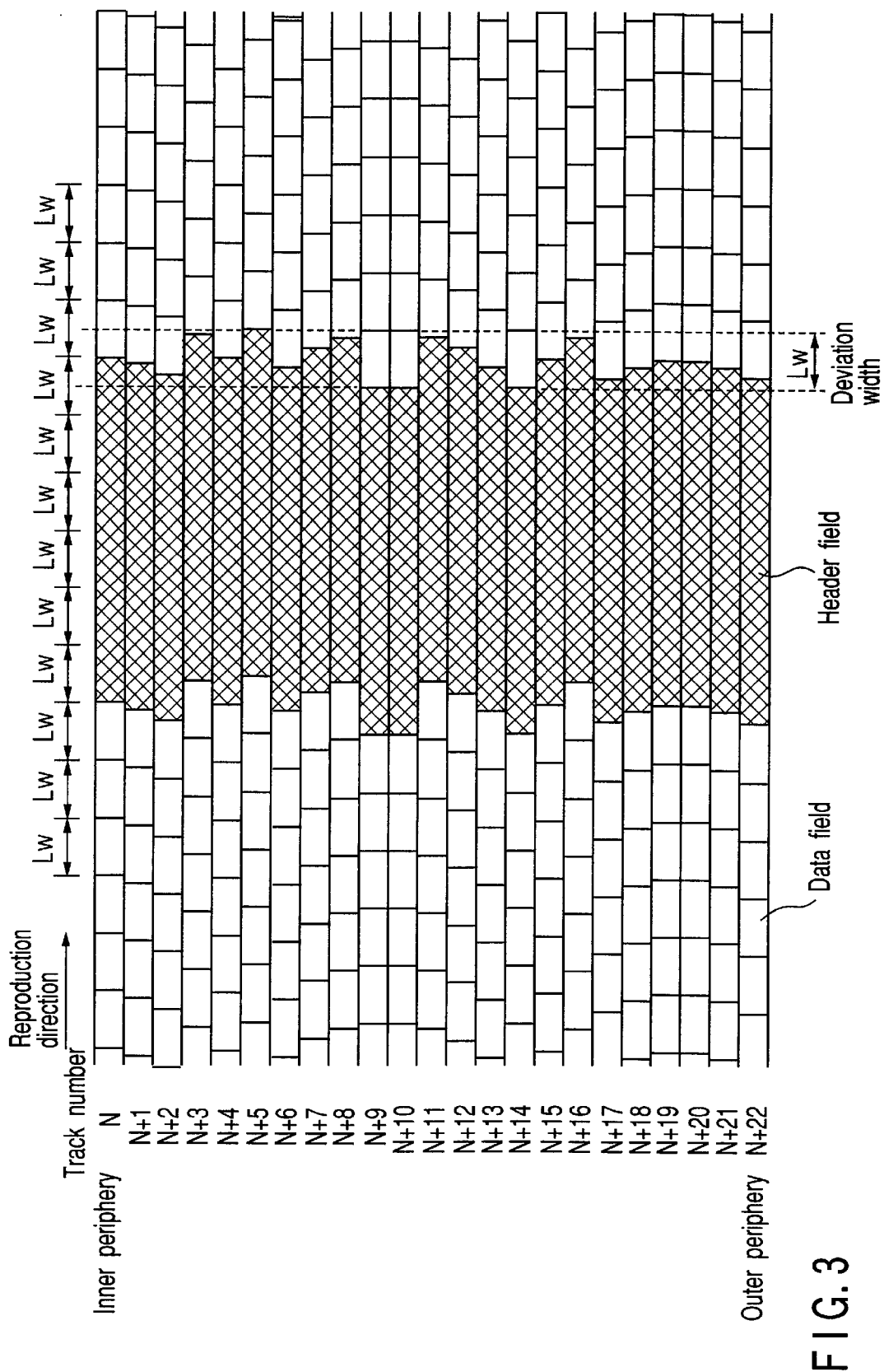
FIG. 3 is a view for explaining the first header layout in an optical disk of the present invention.
Figure 4A:
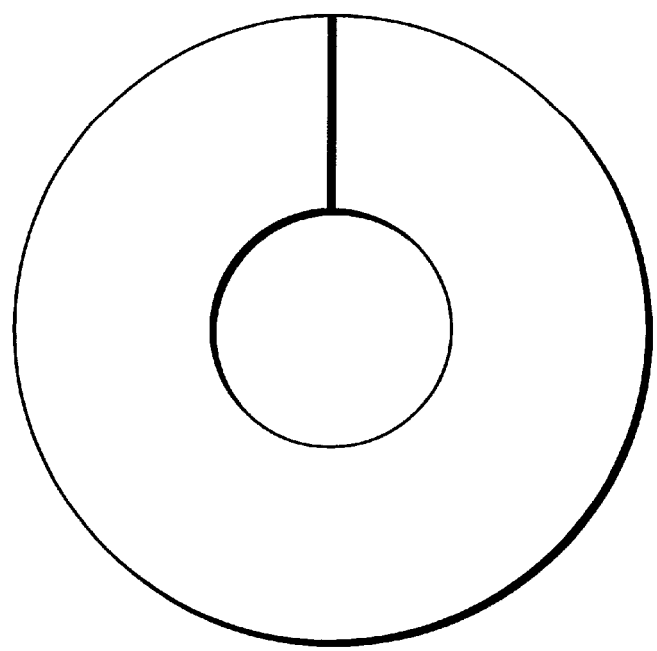
FIGS. 4A and 4B show states wherein all headers are aligned radially as a result of adopting the first header layout shown in FIG. 3.

As a result, headers are laid out, as shown in FIG. 3. As the radius of a track increases from the inner to the outer periphery, the track length increases. Consequently, divisions where the length of the data field becomes an integer multiple of Lw appear at various positions with respect to the reference position. However, when the header spacing is set to be an integer multiple of Lw and is controlled to minimize deviations, the header positions can be laid out within the range of a length Lw with respect to the reference header. On the entire disk, all headers are concentrated on a region with a width Lw, which is aligned radially, as shown in FIG. 4A.

Figure 5A:
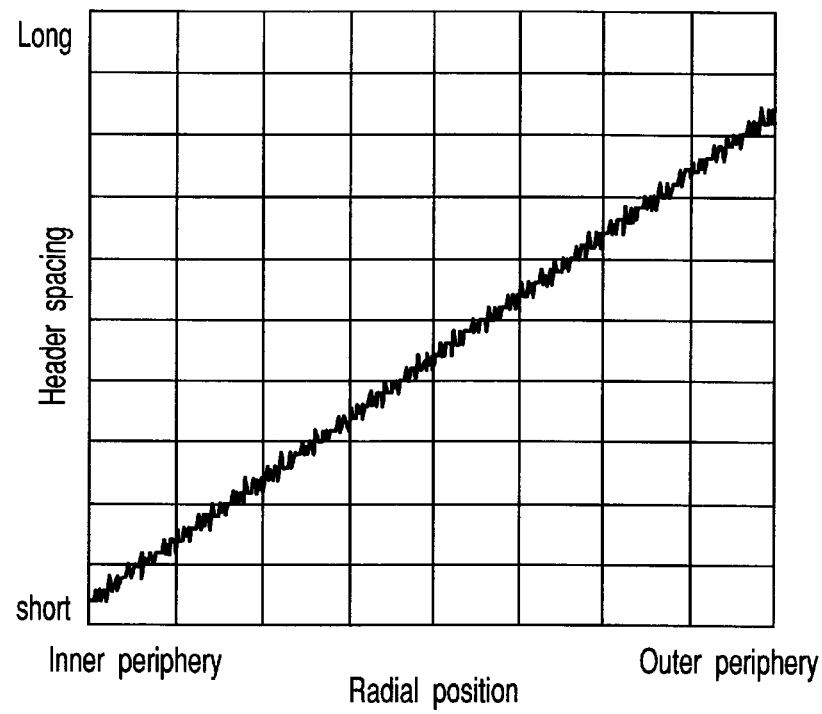
FIGS. 5A and 5B are graphs showing the relationships between the radial position and the header spacing and the header deviation from a reference position as a result of adopting the first header layout shown in FIG. 3.
Figure 5B:
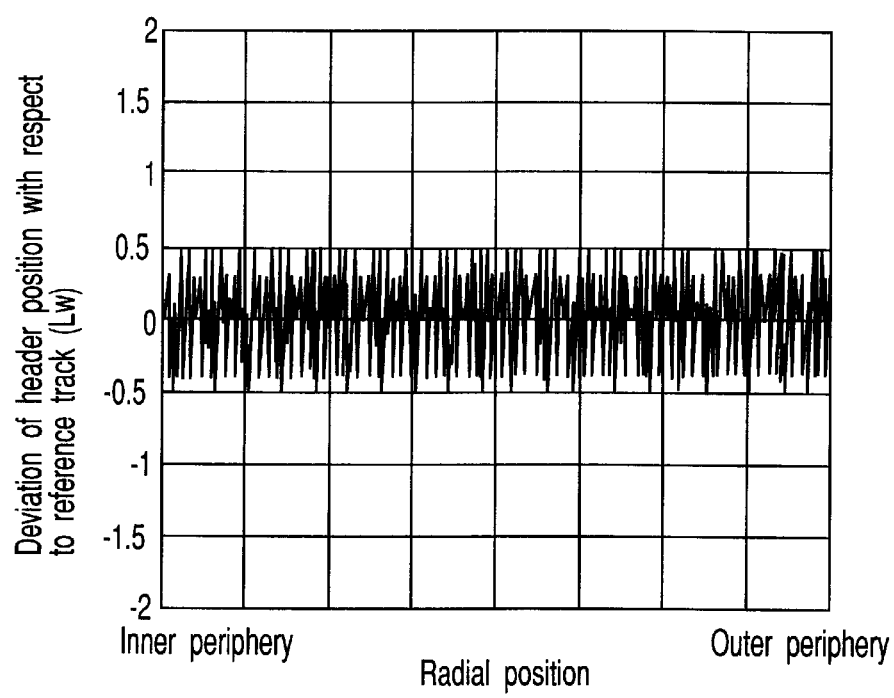

FIGS. 5A and 5B show the relationships between the radial position, and the header spacing and the header deviation from the reference position upon laying out the headers, as described above. As can be seen from FIGS. 5A and 5B, the header spacing becomes larger with increasing radius. The deviation of a header obtained as a difference between the track length per rotation and the spacing between actually laid out headers can always be controlled to be equal to or smaller than Lw although the header spacing changes radially.

Figure 4B:
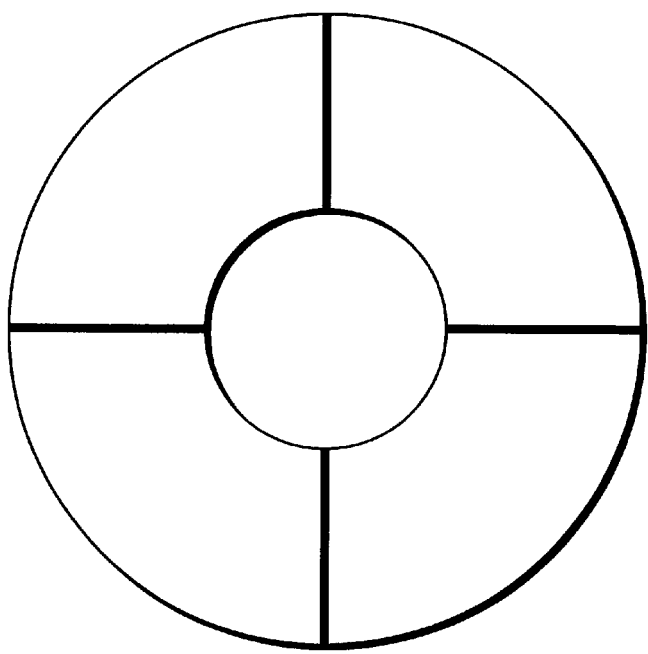

FIG. 4B shows the header layout when four headers per rotation are laid out at an equal spacing on the N-th track. Headers are concentrated on four radial regions. In this case, the deviation of header positions can be controlled to be equal to or smaller than Lw.

Figure 14:
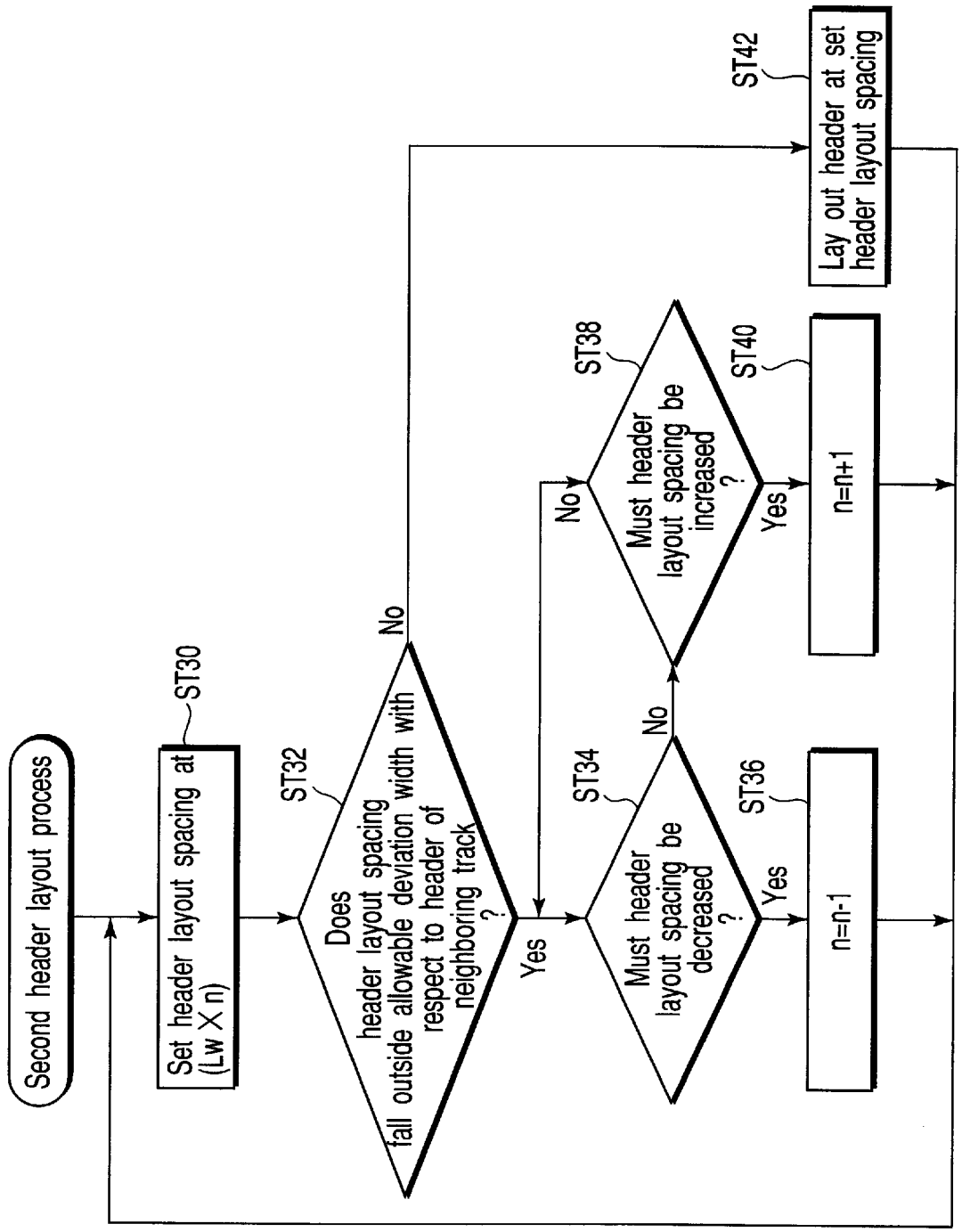
FIG. 14 is a flow chart for explaining the second header layout process.

The second header layout will be explained below with reference to the flow chart shown in FIG. 14.

One header per rotation is laid out on the N-th track, and the header in each track is laid out with reference to the header position of a neighboring track. In this case, one header per rotation is laid out on the innermost track, and the header of each subsequent track is laid out with reference to the header position of a neighboring track on its inner peripheral side. When a deviation from the reference header in the track direction exceeds a predetermined amount Lt, the header spacing is increased by a minimum unit Lw to continue header layout. The predetermined amount Lt used upon determining if the header spacing is increased can assume a value within the range 0≦Lt≦Lw.

That is, a header layout spacing is set at (Lw×n) (step ST30). If the header layout spacing falls outside an allowable deviation width with respect to the header of the neighboring track (ST32, YES), and the header layout spacing must be decreased (ST34, YES), n=n−1 (ST36). That is, the header layout spacing is (Lw×(n−1)). Conversely, if the header layout spacing must be increased (ST38, YES), n=n+1 (ST40). That is, the header layout spacing is (Lw×(n+1)). If the header layout spacing does not fall outside the allowable deviation width with respect to the reference header (ST42, NO), headers are laid out at the set header layout spacing.

Figure 6:
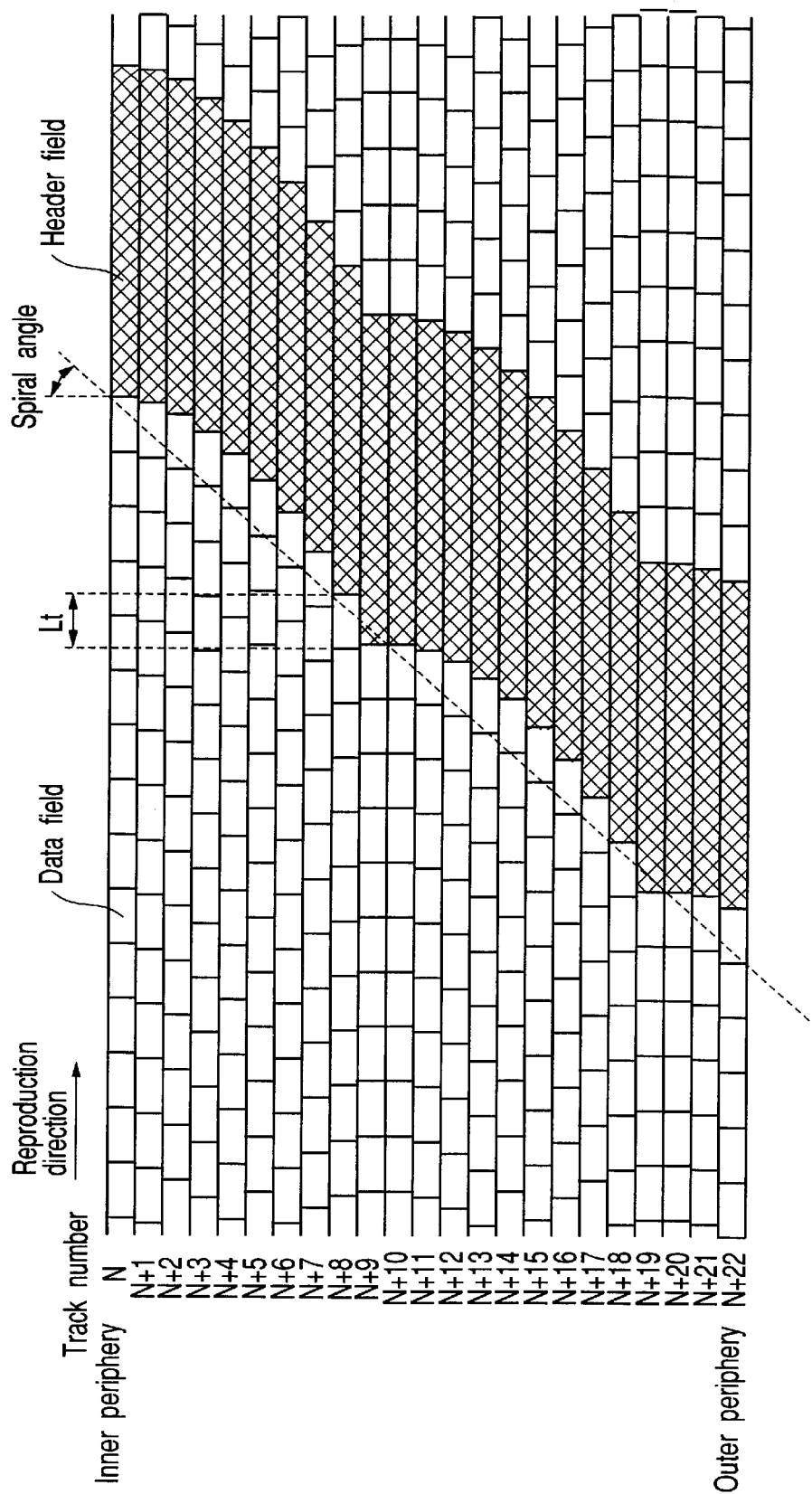
FIG. 6 is a view for explaining the second header layout in an optical disk of the present invention.
Figure 7A:
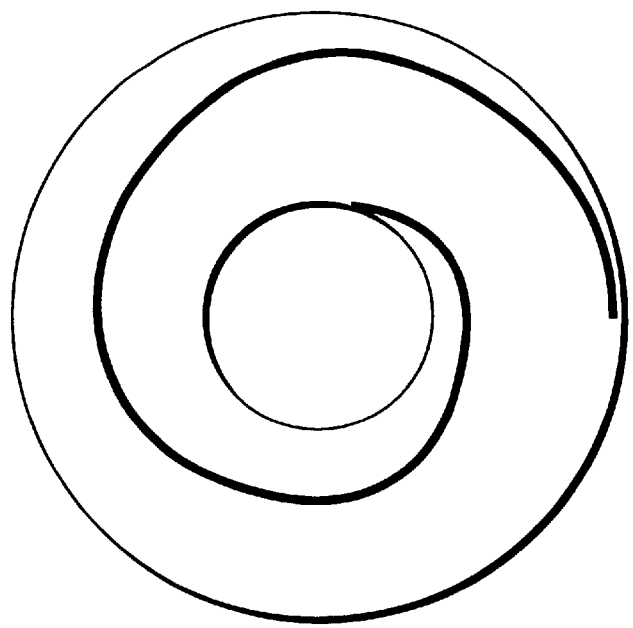
FIGS. 7A and 7B show states wherein all headers are aligned in an irregular spiral pattern as a result of adopting the second header layout shown in FIG. 6.

For example, if Lt=Lw, headers are laid out, as shown in FIG. 6. Since the track length increases toward the outer periphery, the header positions gradually deviate in a direction opposite to the reproduction direction. When the deviation exceeds Lw, since the header spacing is increased by Lw, the deviation decreases. As a result, the deviation from the neighboring track can be controlled to be equal to or smaller than Lw. On the entire disk, all headers are concentrated on a region with a width Lw, which is aligned in a spiral pattern opposite to the reproduction direction, as shown in FIG. 7A.

Figure 8A:
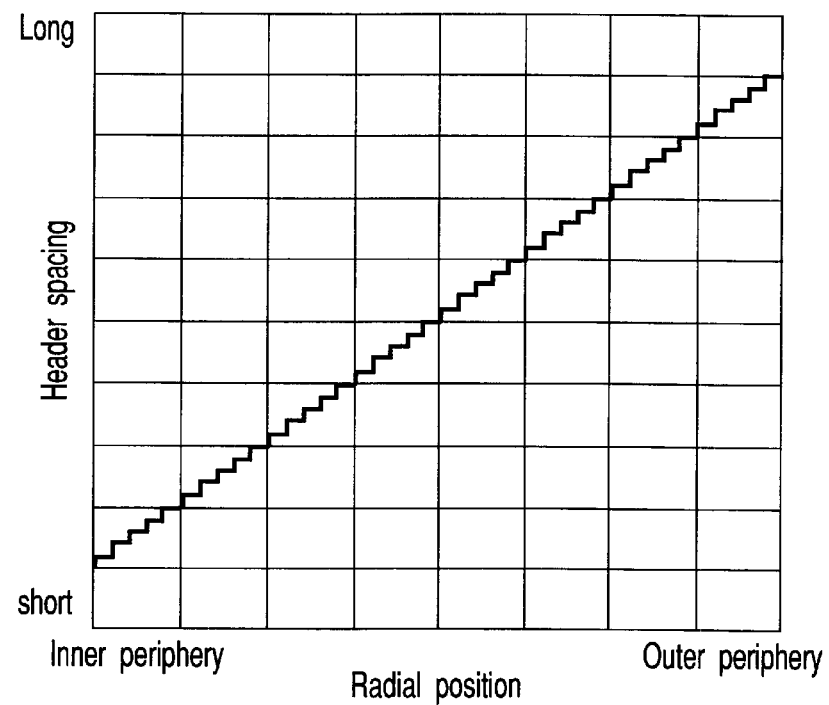
FIGS. 8A and 8B are graphs showing the relationships between the radial position and the header spacing and the header deviation from a reference position as a result of adopting the second header layout shown in FIG. 6.
Figure 8B:
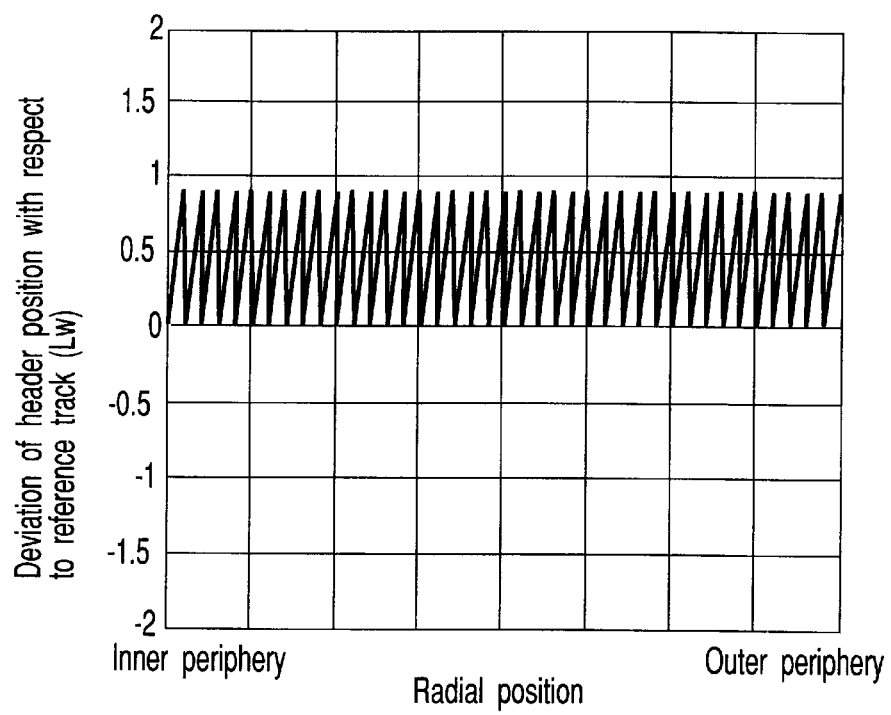

FIGS. 8A and 8B show the relationships between the radial position, and the header spacing and the header deviation from the reference position upon laying out the headers, as described above. As can be seen from FIGS. 8A and 8B, the header spacing gradually becomes larger with increasing radius. The deviation between the headers of neighboring tracks can always be controlled to fall within the range of Lw although the header spacing radially changes in a triangular wave pattern.

Figure 9A:
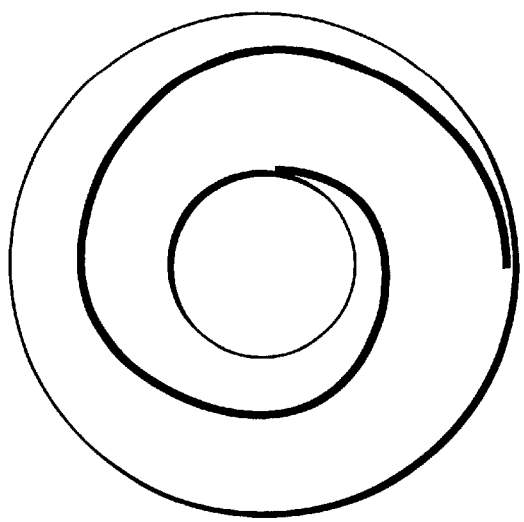
FIGS. 9A, 9B, and 9C show states wherein all headers are aligned in an irregular spiral pattern as a result of adopting the second header layout shown in FIG. 6 and changing a value Lt.
Figure 9B:
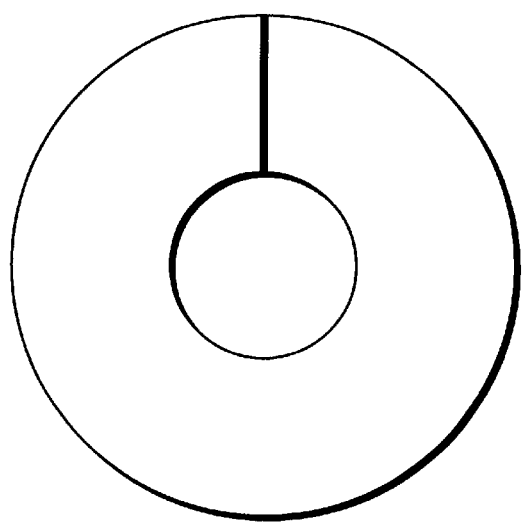
Figure 9C:
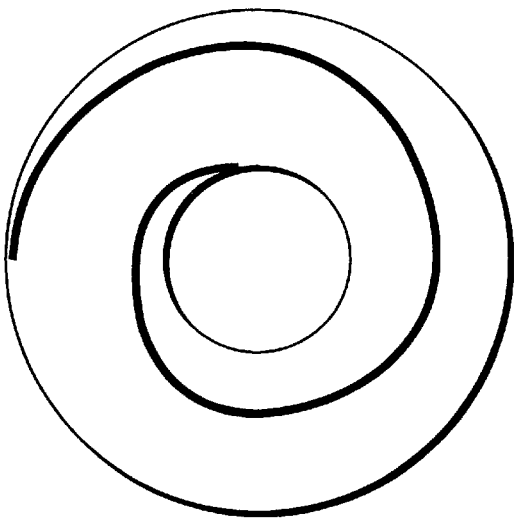

Upon changing the value Lt, the spiral shape formed by headers changes. Under the condition Lw/2<Lt≦Lw, headers are laid out in a reverse spiral pattern as in FIG. 7A, similar to FIG. 9A. If Lt≈Lw/2, headers are laid out nearly radially, as shown in FIG. 9B. Under the condition 0≦Lt<Lw/2, headers are laid out in a spiral pattern in the same direction as in the reproduction direction, i.e., in a direction opposite to FIG. 9A.

Figure 7B:
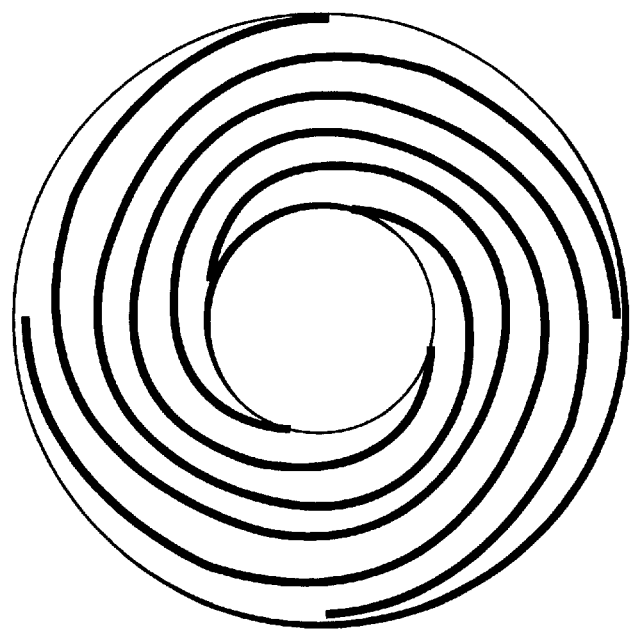

FIG. 7B shows an example of header layout when four headers per rotation are laid out on the N-th track, i.e., four headers are laid out at an equal spacing on the innermost track. Headers are concentrated on four spiral regions. In the same manner as in one header per rotation, the header deviation can be controlled to always fall within Lw, and the header spacing gradually becomes large toward the outer periphery while repeating increase and decrease.

Figure 10A:
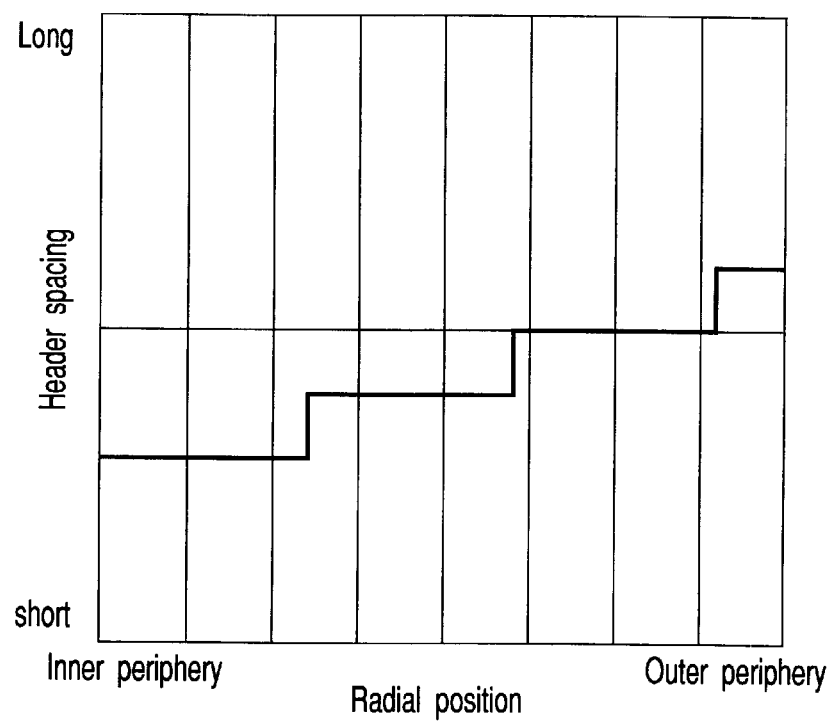
FIGS. 10A and 10B are graphs showing the relationships between the radial position and the header spacing and the deviation between the header positions of neighboring tracks when Lt=2×Lw.
Figure 10B:
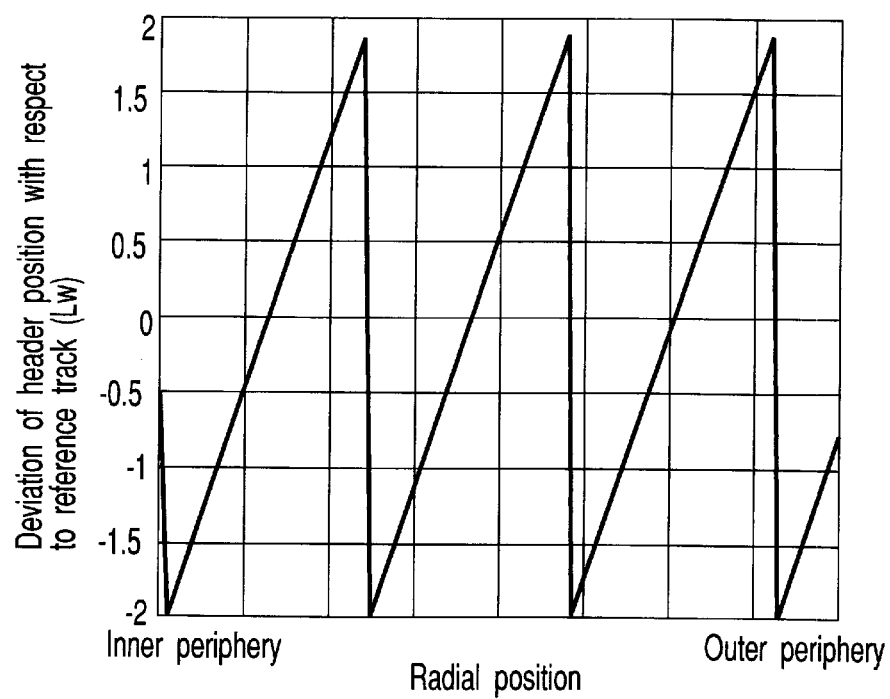

On the other hand, when a condition that the header spacing increases monotonously to have a larger header spacing on the outer peripheral side than that on the inner peripheral side is added, the maximum deviation between the headers of neighboring tracks approximately becomes Lw×"the number of headers per rotation". FIGS. 10A and 10B show the relationships between the radial position, and the header spacing and deviation between the header positions of neighboring tracks when Lt=2×Lw. The latter scheme allows easier header layout, but the maximum deviation becomes slightly larger.

A third method of laying out headers by a simpler algorithm will be explained below.

When Ns headers per rotation are laid out, Ns headers are laid out on a reference track at an equal spacing corresponding to an integer multiple of a wobble period Lw. The innermost track can be selected as the reference track. However, in the present invention the reference track is not limited to the innermost track but any other tracks on the disk may be selected.

A zone is formed for every Ns×Nz headers from this reference track, and the header spacing is increased by M×Lw for each zone toward the outer periphery; the header spacing is decreased by M×Lw for each zone toward the inner periphery. Note that the spacing between neighboring tracks is Tp.

A condition required for arranging headers on a disk to minimize any header deviation from the reference position upon laying out headers according to this method will be explained below.

As given by equation (3), the track length becomes larger from the inner to the outer periphery. By comparing the track length at the head positions of neighboring zones, the track length on the outer peripheral side becomes 2×π×Tp×Nz larger than that on the inner peripheral side for respective zones. An increment Ld of the total track length in a zone between neighboring zones is expressed by "track length difference between zones"×"the number of tracks in a zone", and assumes a value given by:

$$Ld=(2\times\pi\times Tp\times Nz)\times Nz \qquad (4)$$

To minimize the header deviation, the increment Lh of the total track length for each zone must be equal to the sum total of increments of header spacings. The sum total of increments of header spacings is expressed by "increment of header spacing"×"the number of headers in a zone", and assumes a value given by:

$$Lh=(M \times Lw) \times (Ns \times Nz) \quad (5)$$

From equations (4) and (5), since Ld and Lh need only be equal to each other to minimize the deviation of header layout, respective parameters must satisfy:

$$(2 \times \pi \times Tp \times Nz) \times Nz = (M \times Lw) \times (Ns \times Nz) \quad \text{(relation)}$$

That is, $$Nz = 0.5 \times M \times Lw \times Ns / \pi / Tp \quad (6)$$

If it is difficult to select parameters to satisfy equation (6), a period Nz for updating the header spacing to an approximate value can be set.

By adjusting the correspondence between the length of the reference track and header spacing, the arrangement of headers on the disk can be controlled to radial or spiral layout. If the initial value of the header spacing is K×Lw, a total track length Lz of a zone which starts from the reference track and is formed by Ns×Nz headers is given by:

$$Lz = K \times Lw \times Ns \times Nz \quad (7)$$

On the other hand, a total track length Lr of Nz tracks which start from the reference track is given by:

$$Lr = \pi \times (2 \times R0 + Nz \times Tp) \times Nz \quad (8)$$

where Ro is the radius of the reference track, and Tp is the track pitch.

At this time, when Lz=Lr, the rotational angle at the beginning of a zone becomes equal to that at the end of the zone, and headers are nearly radially laid out on the disk. Since the above equation considers the track shape as a circle for the sake of simplicity, a condition slightly deviating from this condition is required to radially lay out headers accurately.

When Lz≠Lr, headers are laid out in a spiral pattern on the disk. The direction of spiral changes depending on the magnitudes of Lz and Lr, and the spiral angle increases with increasing absolute value of the difference between Lz and Lr.

Upon above header layout, when grooves formed on the disk are wobbled, the header spacings and wobble periods are preferably associated. When the header spacing is an integer multiple of the minimum unit Lw of space control, Lw and the wobble period are set at an integer ratio. At this time, the header spacing can always maintain an integer multiple of the wobble period, and the header position can be estimated by counting wobble periods. Also, the waveform phase of wobbles near a header can be fixed. Since the continuity of a wobble signal can be maintained upon detecting the wobble signal, it is easy to detect the wobble signal even when the header spacing has changed.

The reference track of header layout is not limited to the innermost peripheral track. Even when the header position of an arbitrary track is assigned as a reference position, the same result can be obtained.

The structure of a header field will be explained below.

Assume that headers are laid out in such a manner that four headers are laid out per rotation, and when the deviation between the header positions of neighboring tracks exceeds two wobble periods, the header spacing is monotonously increased by one wobble period. The header size is specified by 48 wobbles. At this time, headers are laid out to be concentrated on narrow ranges that extend nearly radially at 90° intervals on the disk.

Figure 11:
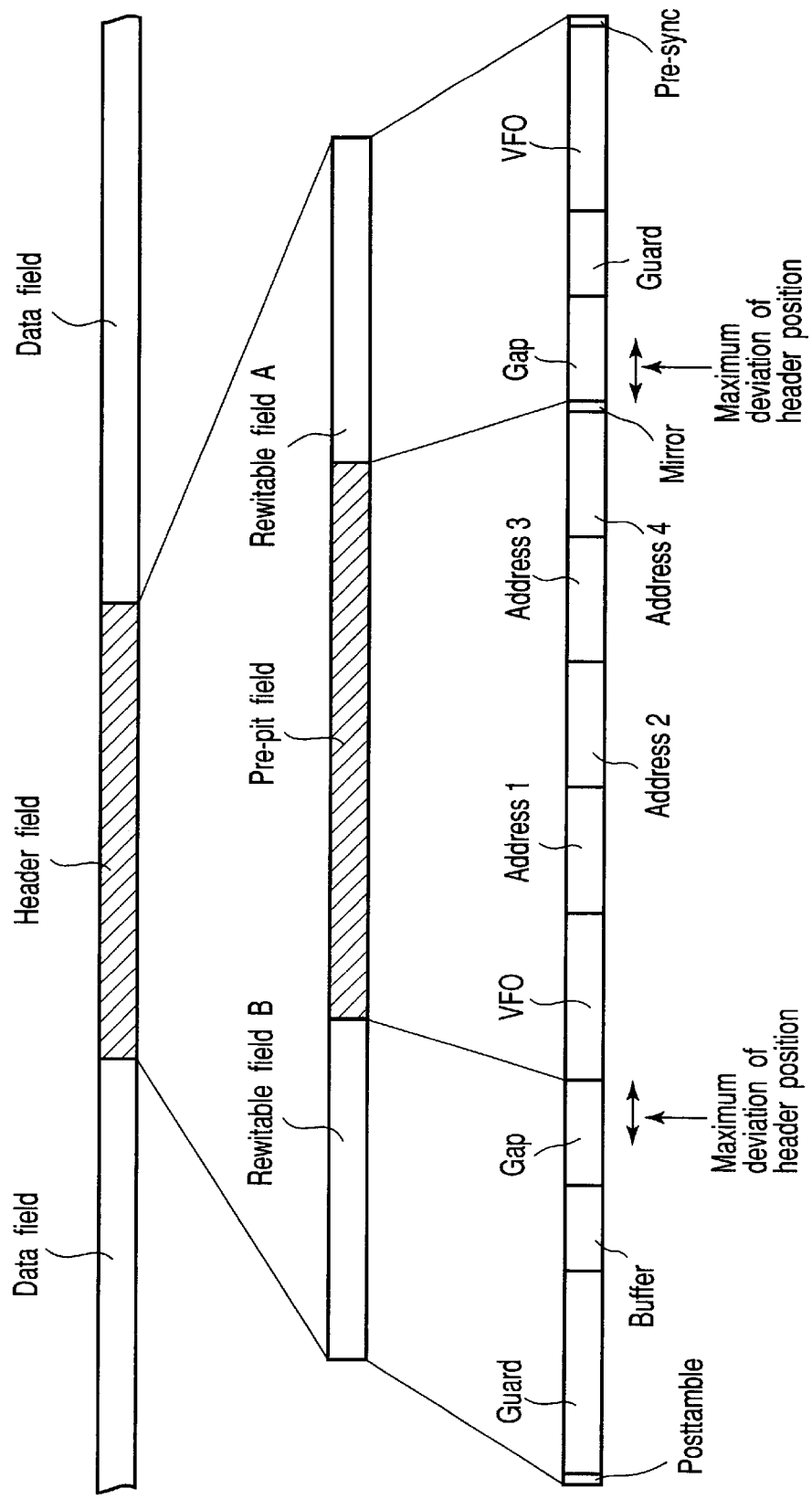
FIG. 11 shows the structure of a header field in an optical disk of the present invention.

FIG. 11 shows an example of the structure of the header field.

The header field is roughly formed by a pre-pit header field formed by an embossed pattern in the manufacture of a disk, and a recordable rewritable header field on which the same grooves as those on a data field are formed. The pre-pit header field is comprised of VFO, address, and mirror fields. On the VFO field, repetitive patterns required for clock synchronization are recorded. On the address field, ID information indicating a position on the disk is repetitively recorded. Each ID is protected by a pattern for data synchronization and a parity for error check. Nothing is recorded on the mirror field.

The rewritable header field is divided into field A extending from the pre-pit field to the data field, and field B extending from the data field to the pre-pit field. Field A mainly executes a pre-process required for rewrite of the subsequent data field, and field B executes an end process required for rewrite of the previous data field. Field A is comprised of gap, guard, VFO, and pre-sync fields. Field B is comprised of postamble, guard, buffer, and gap fields. The gap fields at the two ends of the pre-pit field are margin fields that avoid inadvertent recording on the pre-pit field, and record no data. The buffer field is used to absorb the influences of variations of the physical length of a recording field due to variations of the rotational speed of the disk or frequency variations of recording clocks, and records no data. The guard field records fixed repetitive patterns to avoid the last part of the data field and VFO from deteriorating when rewrite is repeated. The pre-sync field records a fixed specific pattern to identify the head of the data field.

Figure 12:
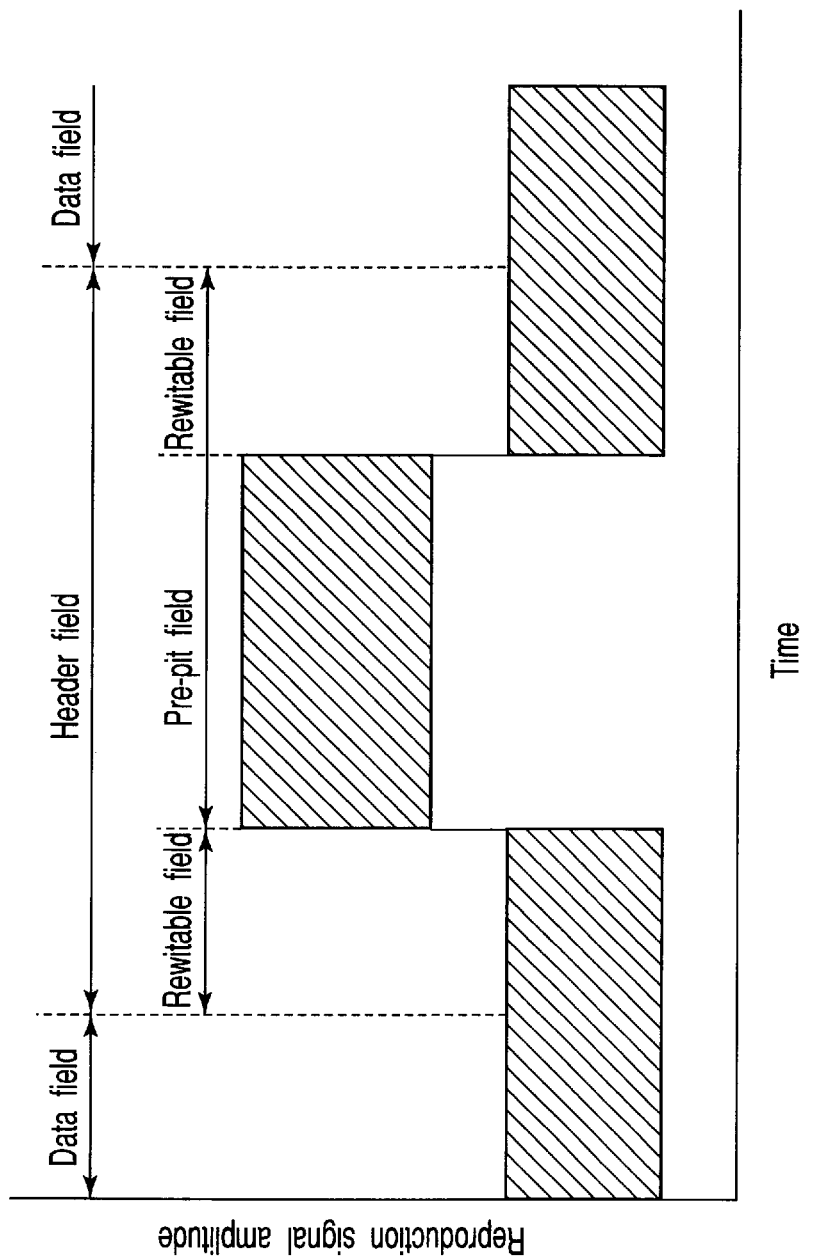
FIG. 12 shows a change in reproduction signal amplitude in a header field in an optical disk of the present invention.

The pre-pit field recorded by an embossed pattern on the substrate and the rewritable field recorded as a change in reflectance have largely different reproduction signal levels, as shown in FIG. 12. Upon narrowing down the track spacing to improve the recording density, a given track suffers a disturbance called crosstalk from a neighboring track. When the signal levels have a large difference, as shown in FIG. 12, if a signal of the pre-pit field with high level is present on a neighboring track, and a track, reproduction of which is underway, is a rewritable field, the main signal deteriorates considerably due to the influence of crosstalk.

Assume that the maximum deviation between neighboring tracks is limited to two wobbles or less. At this time, a field that considerably suffers deterioration due to crosstalk is limited to 2-wobble ranges on the two sides of the pre-pit fields. In the header structure shown in FIG. 11, GAP fields are laid out on the two sides of the pre-pit fields, and have sizes of two wobbles or more. Since the GAP fields record no data for the purpose of protecting the pre-pit field, no problem is posed even when crosstalk disturbance has occurred in this field. The buffer field that records no data as in the GAP fields is also free from the influence of crosstalk. As for the guard field, since specific repetitive patterns are recorded to protect the last part of the data field and VFO field, this field is hardly influenced by crosstalk.

Hence, as long as the deviation between header fields of neighboring tracks falls within the no data recording range like the GAP fields on the two sides of the pre-pit field and the buffer field, stable operation free from the influence of crosstalk can be assured.

Even when the deviation between header fields of neighboring tracks falls outside the sizes of the GAP and buffer fields, the influence of crosstalk can be minimized as long as it falls within the range of the guard field that records specific repetitive pattern.

As described above, according to the first header layout of the present invention, since the header spacing is controlled by a predetermined unit to minimize the deviation of the header position with reference to the header position of a specific track, even when recording is done using the constant linear density scheme, any header deviation with respect to the reference header position can be reduced.

Also, according to the second header layout of the present invention, since the header spacing is controlled by a predetermined unit to minimize the deviation between header positions of neighboring tracks, even when recording is done using the constant linear density scheme, any header deviation between the header positions of neighboring tracks can be reduced.

Furthermore, according to the header structure of the present invention, since the non-recording fields located on the two sides of the pre-pit fields and the field where specific patterns are recorded have a size larger than the maximum deviation between the header positions of neighboring tracks, reproduction data hardly suffers crosstalk disturbance. Hence, the reliability of reproduction data can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk-shaped information recording medium having:
   a spiral track,
   said spiral track having:
      one or more header fields per round of said spiral track; and
      a data field located between neighboring header fields, and
      said data field having a variable length corresponding to an integer multiple of a predetermined length Lw so as to minimize a deviation between an n-th header field in a predetermined round of said spiral track, and an n-th header field in a round different from the predetermined round in a track direction.

2. A medium according to claim 1, wherein said data field has a variable length corresponding to the integer multiple of the predetermined length Lw so as to minimize a deviation between the n-th header field in the predetermined round, and an n-th header field in a round that neighbors the predetermined round in the track direction.

3. A medium according to claim 1, wherein said data field has a variable length corresponding to the integer multiple of the predetermined length Lw so as to prevent a deviation between the n-th header field in the predetermined round, and an n-th header field in a round that neighbors the predetermined round in the track direction from exceeding a prescribed value.

4. A medium according to claim 1, wherein said header field has:
   a first rewritable field;
   a pre-pit field that follows a terminal end of said first rewritable field; and
   a second rewritable field that follows a terminal end of said pre-pit field, and
   if a maximum deviation width produced as a result of varying a length of said data field by the integer multiple of the predetermined length Lw is defined by W,
   a field where no data is recorded or a field where a fixed pattern is recorded is laid out within a range of W from an arbitrary position to the terminal end of said first rewritable field, and a range of W from the terminal end of said pre-pit field to an arbitrary position of said second rewritable field.

5. A medium according to claim 1, wherein said spiral track is wobbled in a radial direction of said medium at a predetermined period, and
   the predetermined length Lw is a length corresponding to an integer multiple of the predetermined period.

6. An information reproduction apparatus for reproducing a disk-shaped information recording medium, said information recording medium having:
   a spiral track,
   said spiral track having:
      one or more header fields per round of said spiral track; and
      a data field located between neighboring header fields, and
      said data field having a variable length corresponding to an integer multiple of a predetermined length Lw so as to minimize a deviation between an n-th header field in a predetermined round of said spiral track, and an n-th header field in a round different from the predetermined round in a track direction, and
   said information reproduction apparatus comprising:
      rotation control means for controlling a rotational speed of said information recording medium to obtain a constant linear velocity;
      header processing means for detecting said header field from said information recording medium which undergoes the rotation control of said rotation control means, and reproducing address information from said header field; and
      reproduction means for reproducing target data from said data field on the basis of the address information obtained by said header processing means.

7. An apparatus according to claim 6, wherein an information recording medium, in which said data field has a variable length corresponding to the integer multiple of the predetermined length Lw so as to minimize a deviation between the n-th header field in the predetermined round, and an n-th header field in a round that neighbors the predetermined round in the track direction, is reproduced.

8. An apparatus according to claim 6, wherein an information recording medium, in which said data field has a variable length corresponding to the integer multiple of the predetermined length Lw so as to prevent a deviation between the n-th header field in the predetermined round, and an n-th header field in a round that neighbors the predetermined round in the track direction from exceeding a prescribed value, is reproduced.

9. An information recording apparatus for recording data on a disk-shaped information recording medium,
   said information recording medium having:
      a spiral track,
      said spiral track having:
         one or more header fields per round of said spiral track; and
         a data field located between neighboring header fields, and
         said data field having a variable length corresponding to an integer multiple of a predetermined length Lw so as to minimize a deviation between an n-th header field in a predetermined round of said spiral track, and an n-th header field in a round different from the predetermined round in a track direction, and said information recording apparatus comprising:
rotation control means for controlling a rotational speed of said information recording medium to obtain a constant linear velocity;
header processing means for detecting said header field from said information recording medium which undergoes the rotation control of said rotation control means, and reproducing address information from said header field; and
recording means for recording target data on said data field on the basis of the address information obtained by said header processing means.

10. An apparatus according to claim 9, wherein data is recorded on an information recording medium in which said data field has a variable length corresponding to the integer multiple of the predetermined length Lw so as to minimize a deviation between the n-th header field in the predetermined round, and an n-th header field in a round that neighbors the predetermined round in the track direction.

11. An apparatus according to claim 9, wherein data is recorded on an information recording medium in which said data field has a variable length corresponding to the integer multiple of the predetermined length Lw so as to prevent a deviation between the n-th header field in the predetermined round, and an n-th header field in a round that neighbors the predetermined round in the track direction from exceeding a prescribed value.

* * * * *